US008247355B2

(12) United States Patent  (10) Patent No.: US 8,247,355 B2
Li et al.  (45) Date of Patent: Aug. 21, 2012

(54) ACIDIC VISCOSITY ENHANCER FOR VISCOELASTIC SURFACTANT FLUIDS

(75) Inventors: Leiming Li, Sugar Land, TX (US);
Lijun Lin, Sugar Land, TX (US);
Mathew M. Samuel, Sugar Land, TX (US); Syed Ali, Sugar Land, TX (US);
Paul R. Howard, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/491,459

(22) Filed: Jun. 25, 2009

(65) Prior Publication Data
US 2010/0331223 A1  Dec. 30, 2010

(51) Int. Cl.
*C09K 8/62* (2006.01)
*C09K 8/68* (2006.01)
*C09K 8/74* (2006.01)

(52) U.S. Cl. ........ 507/240; 507/241; 507/244; 507/267; 507/269; 507/277; 166/305.1

(58) Field of Classification Search .......................... None
See application file for complete search history.

(56) References Cited

U.S. PATENT DOCUMENTS

| 6,068,056 | A | * | 5/2000 | Frenier et al. ................. 166/307 |
|---|---|---|---|---|
| 6,929,070 | B2 | * | 8/2005 | Fu et al. ..................... 166/308.2 |
| 7,028,775 | B2 | * | 4/2006 | Fu et al. ..................... 166/308.2 |
| 7,299,874 | B2 | | 11/2007 | Welton et al. |
| 7,306,041 | B2 | * | 12/2007 | Milne et al. ................. 166/308.2 |
| 7,320,952 | B2 | | 1/2008 | Chen et al. |
| 7,378,378 | B2 | | 5/2008 | Chen et al. |
| 7,387,986 | B2 | | 6/2008 | Chen et al. |
| 7,387,987 | B2 | | 6/2008 | Chen et al. |
| 7,402,549 | B2 | | 7/2008 | Chen et al. |
| 7,635,028 | B2 | * | 12/2009 | Li et al. ......................... 166/300 |
| 7,878,246 | B2 | * | 2/2011 | Samuel et al. ................. 166/297 |
| 2003/0139298 | A1 | * | 7/2003 | Fu et al. ........................ 507/200 |
| 2005/0126786 | A1 | * | 6/2005 | Fu et al. ........................ 166/307 |
| 2008/0066916 | A1 | * | 3/2008 | Li et al. ..................... 166/305.1 |
| 2008/0167205 | A1 | | 7/2008 | Chen et al. |

FOREIGN PATENT DOCUMENTS
WO  WO 9856497 A1 * 12/1998
* cited by examiner

*Primary Examiner* — John J Figueroa
(74) *Attorney, Agent, or Firm* — Michael Dae; Daryl Wright; Robin Nava

(57) ABSTRACT

The invention discloses method of treating a subterranean formation of a well bore, the method comprising: providing a treatment fluid comprising: an aqueous base fluid; a viscosity enhancer; and a viscoelastic surfactant, wherein the enhancer is acid in the aqueous base fluid and co-operates with the viscoelastic surfactant to enhance viscosity compared to viscoelastic surfactant alone in the aqueous base fluid; and introducing the treatment fluid into the well bore.

14 Claims, 9 Drawing Sheets

ACIDIC VISCOSITY ENHANCER FOR VISCOELASTIC SURFACTANT FLUIDS

FIELD OF THE INVENTION

The invention relates to methods and compositions for treating subterranean formations. More particularly, the present invention relates to viscoelastic surfactant treatment fluids that comprise an acidic viscosity enhancer and associated methods.

BACKGROUND

Viscosified treatment fluids may be used in a variety of subterranean treatments. Such treatments include, but are not limited to stimulation treatments, sand control treatments and other similar applications. As used herein, the term "treatment", or "treating", refers to any subterranean operation that uses a fluid in conjunction with a desired function and/or for a desired purpose. The term "treatment", or "treating", does not imply any particular action by the fluid.

Hydraulic fracturing operations generally involve pumping a viscosified treatment fluid (e.g., a fracturing fluid) into a well bore that penetrates a subterranean formation at a sufficient hydraulic pressure to create or enhance one or more cracks, or "fractures", in the subterranean formation. The fracturing fluid may comprise particulates, often referred to as proppant, that are deposited in the fractures. The proppant function is, inter alia, to prevent the fractures from fully closing upon the release of hydraulic pressure, forming conductive channels through which fluids may flow to the well bore. Once at least one fracture is created and the proppants are substantially in place, the viscosity of the fracturing fluid usually is reduced, and the fracturing fluid may be recovered from the formation.

Treatment fluids are also utilized in sand control treatments, such as gravel packing. In gravel-packing treatments, the viscosified treatment fluid suspends particulates (commonly referred to as "gravel particulates") for delivery to a desired area in a well bore, e.g., near unconsolidated or weakly consolidated formation zones, to form a gravel pack to enhance sand control. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid is often reduced to allow it to be recovered. In some situations, fracturing and gravel-packing treatments are combined into a single treatment (commonly referred to as "frac pack" operations) to provide stimulated production and an annular gravel pack to reduce formation sand production. In some cases, the treatments are completed with a gravel pack screen assembly in place, and the fracturing treatment fluid being pumped through the annular space between the casing and screen. In such a situation, the fracturing treatment usually ends in a screen-out condition, creating an annular gravel pack between the screen and casing. This allows both the fracturing treatment and gravel pack to be placed in a single operation.

Maintaining sufficient viscosity is important in fracturing treatments for particulate transport, as well as to create or enhance fracture width. Particulate transport is also important in sand control treatments, such as gravel packing. Also, maintaining sufficient viscosity may be important to control and/or reduce leak-off into the formation. To provide the desired viscosity, polymeric gelling agents commonly are added to the treatment fluids. Examples of commonly used polymeric gelling agents include, but are not limited to, guar gums and derivatives thereof, cellulose derivatives, biopolymers, and the like. The use of polymeric gelling agents, however, may be problematic. For instance, these polymeric gelling agents may leave an undesirable residue in the subterranean formation after use. As a result, potentially costly remedial operations may be required to clean up the fracture face and proppant pack. Foamed treatment fluids and emulsion-based treatment fluids have been employed to minimize residual damage, but increased expense and complexity often result.

To combat these problems associated with polymeric gelling agents, some surfactants have been used as gelling agents. Certain surfactants, when mixed with an aqueous fluid having a certain ionic strength, are capable of forming a viscous fluid that has certain elastic properties, one of which may be shear thinning. Surfactant molecules (or ions) at specific conditions may form micelles (e.g., worm-shaped micelles, rod-shaped micelles, etc.) in an aqueous fluid. Depending on, among other things, the surfactant concentration, and the ionic strength of the fluid, etc., these micelles may impart increased viscosity to the aqueous fluid, such that the fluid exhibits viscoelastic behavior due, at least in part, to the association of the surfactant molecules contained therein.

As a result, these treatment fluids exhibiting viscoelastic behavior may be used in a variety of subterranean treatments where a viscosified treatment fluid may be useful. Because the micelles may be sensitive to the pH and hydrocarbons, the viscosity of these treatment fluids may be reduced after introduction into the subterranean formation without the need for conventional gel breakers (e.g., oxidizers). This may allow a substantial portion of the treatment fluid to be produced back from the formation without the need for expensive remedial treatments.

Composition and methods from the invention offer an alternative to some types of additives used to increase viscosity of viscoelastic surfactants.

SUMMARY

In a first aspect, a method of treating a subterranean formation of a well bore is disclosed. The method comprises: providing a treatment fluid comprising: an aqueous base fluid; a viscosity enhancer; and a viscoelastic surfactant, wherein the enhancer is acid in the aqueous base fluid and co-operates with the viscoelastic surfactant to enhance viscosity compared to viscoelastic surfactant alone in the aqueous base fluid; and introducing the treatment fluid into the well bore. The viscosity enhancement may be an increase in viscosity, or any suitable rheology modification for a particular operation.

In an embodiment, the viscosity enhancer is an acid, a salt, a latent acid or a combination thereof. In an embodiment, the viscoelastic surfactant is a cationic, anionic, amphoteric or zwitterionic, or nonionic surfactant.

In one embodiment, when the viscoelastic surfactant is cationic, the viscosity enhancer is a mineral acid. In another embodiment, when the viscoelastic surfactant is cationic, the viscosity enhancer is an aromatic organic acid or the salt of an aromatic organic acid. In another embodiment, when the viscoelastic surfactant is zwitterionic, the viscosity enhancer is an aromatic organic acid or the salt of an aromatic organic acid.

In an embodiment, the viscoelastic surfactant is erucyl bis-(2-hydroxyethyl) methyl ammonium chloride. And optionally, the enhancer is nitric acid, nitrate, hydrochloric acid, sulfuric acid, ammonium persulfate, phosphoric acid, salicylate, monosodium glutamate, sodium formate, or a mixture thereof.

In another embodiment, the viscoelastic surfactant is erucic amidopropyl dimethyl betaine. And optionally, the enhancer is salicylate or a mixture thereof.

In a second aspect, a method of fracturing a subterranean formation of a well bore is disclosed. The method comprises: providing a treatment fluid comprising: an aqueous base fluid; a viscosity enhancer; and a viscoelastic surfactant, wherein the enhancer is acid in the aqueous base fluid and co-operates with the viscoelastic surfactant to enhance viscosity compared to viscoelastic surfactant alone in the aqueous base fluid; and introducing the treatment fluid into the well bore at or above a pressure sufficient to create or enhance one or more fractures in a portion of the subterranean formation. The viscosity enhancement may be an increase in viscosity, or any suitable rheology modification for a particular operation. In an embodiment, the viscosity enhancer is an acid, a salt, a latent acid or a combination thereof. In an embodiment, the viscoelastic surfactant is a cationic, anionic, amphoteric or zwitterionic, or nonionic surfactant.

In one embodiment, when the viscoelastic surfactant is cationic, the viscosity enhancer is a mineral acid. In another embodiment, when the viscoelastic surfactant is cationic, the viscosity enhancer is an aromatic organic acid or the salt of an aromatic organic acid. In another embodiment, when the viscoelastic surfactant is zwitterionic, the viscosity enhancer is an aromatic organic acid or the salt of an aromatic organic acid.

In an embodiment, the viscoelastic surfactant is erucyl bis-(2-hydroxyethyl) methyl ammonium chloride. And optionally, the enhancer is nitric acid, nitrate, hydrochloric acid, sulfuric acid, ammonium persulfate, phosphoric acid, salicylate, monosodium glutamate, sodium formate, or a mixture thereof.

In another embodiment, the viscoelastic surfactant is erucic amidopropyl dimethyl betaine. And optionally, the enhancer is salicylate or a mixture thereof.

In another embodiment, the method further comprises introducing proppant into the well bore.

In a third aspect, a method of gravel packing a subterranean formation of a well bore is disclosed. The method comprises: providing a fluid comprising: an aqueous base fluid; a viscosity enhancer; and a viscoelastic surfactant, wherein the enhancer is acid in the aqueous base fluid and co-operates with the viscoelastic surfactant to enhance viscosity compared to viscoelastic surfactant alone in the aqueous base fluid; and introducing the fluid into the well bore. The viscosity enhancement may be an increase in viscosity, or any suitable rheology modification for a particular operation.

DETAILED DESCRIPTION

Figure 1:
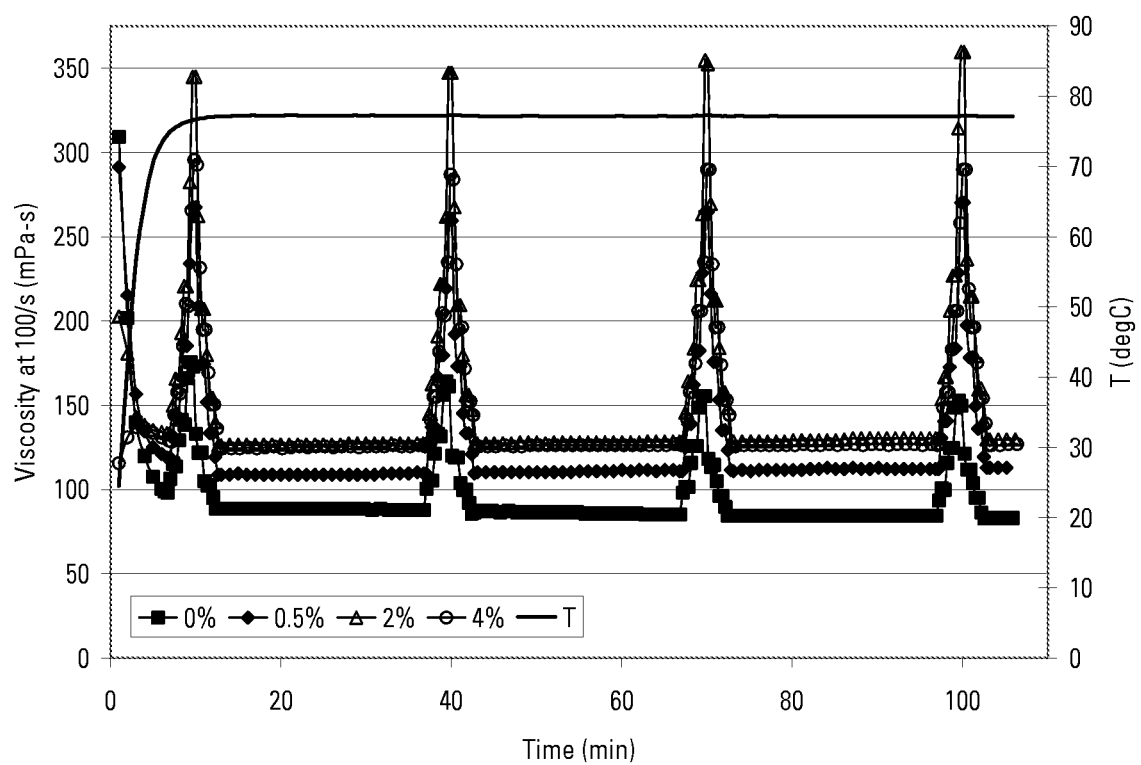
FIG. 1 shows viscosity profiles at 76.7 deg C. for VES1 at 4% by weight in 4% by weight KCl brine with 10% by weight nitric acid for various concentrations 0%, 0.5%, 2%, and 4% respectively.

At the outset, it should be noted that in the development of any actual embodiments, numerous implementation-specific decisions must be made to achieve the developer's specific goals, such as compliance with system- and business-related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

According to an embodiment of the invention a composition is disclosed. The treatment fluid composition comprises an aqueous base fluid, a viscoelastic surfactant, noted further VES, and an acid viscosity enhancer. The aqueous base fluid used in the treatment fluids of the present invention may comprise fresh water, saltwater (e.g., water containing one or more salts dissolved therein), brine, seawater, or combinations thereof. Generally, the water may be from any source, provided that it does not contain components that might adversely affect the stability of the treatment fluids of the present invention. Alternatively, the water may be treated according to methods as described in U.S. patent application Ser. Nos. 12/143,105 and 12/410,160 assigned to same Applicant.

The acid viscosity enhancer has a pH below 7, preferably below 5 and more preferably below 4. The viscosity enhancer may be in the form of an acid, a salt, a latent acid or a combination thereof. The viscosity enhancer may be selected as a mineral acid, for example: hydrochloric acid, nitric acid, nitrous acid, phosphoric acid, phosphorus acid, hypophosphorus acid, sulfuric acid, boric acid, hydrofluoric acid, hydrobromic acid, or selenic acid. The viscosity enhancer may be selected as an organic acid, for example lactic acid, acetic acid, formic acid, citric acid, glutamic acid or oxalic acid. As well, the viscosity enhancer may be selected as an aromatic organic acid, for example salicylic acid. The viscosity enhancer may be in the form of the salt associated to the acid disclosed previously or any other salt that may become acid in the aqueous base fluid. By way of example the salt can be salicylate, formate, glutamate, phosphate, sulfate, nitrate, or ammonium persulfate.

The acid viscosity enhancer co-operates with the viscoelastic surfactant to increase viscosity of the treatment fluid compared to a fluid made of the viscoelastic surfactant alone in the aqueous base fluid. Interaction between enhancer and VES is not known, but applicants have surprisingly discovered that some acids in combination with VES act as enhancer of the viscosity.

The VES may be selected from the group consisting of cationic, anionic, zwitterionic, amphoteric, nonionic and combinations thereof. Some non-limiting examples are those cited in U.S. Pat. No. 6,435,277 (Qu et al.) and U.S. Pat. No. 6,703,352 (Dahayanake et al.), each of which is incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in many cases in the presence of an electrolyte, surfactant molecules aggregate into species such as micelles, which can interact to form a network exhibiting viscous and elastic behavior.

Non-limiting examples of suitable viscoelastic surfactants useful for viscosifying some fluids include cationic surfactants, anionic surfactants, zwitterionic surfactants, amphoteric surfactants, nonionic surfactants, and combinations thereof.

In general, particularly suitable zwitterionic surfactants have the formula:

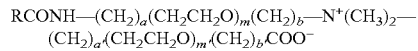

in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and $CH_2CH_2O$ may also be $OCH_2CH_2$.

In an embodiment of the invention, a zwitterionic surfactant of the family of betaine is used. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol. VES systems, in particular BET-E-40, optionally contain about 1% of a condensation product of a naphthalene sulfonic acid, for example sodium polynaphthalene sulfonate, as a rheology modifier, as described in U.S. Patent Application Publication No. 2003-0134751. The surfactant in BET-E-40 is also shown below; one chemical name is erucylamidopropyl betaine. As-received concentrates of BET-E-40 were used in the experiments reported below, where they will be referred to as "VES". BET surfactants, and other VES's that are suitable for the present invention, are described in U.S. Pat. No. 6,258,859. According to that patent, BET surfactants make viscoelastic gels when in the presence of certain organic acids, organic acid salts, or inorganic salts; in that patent, the inorganic salts were present at a weight concentration up to about 30%. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below. Other suitable co-surfactants include, for example those having the SDBS-like structure in which x=5–15; preferred co-surfactants are those in which x=7–15. Still other suitable co-surfactants for BET-O-30 are certain chelating agents such as trisodium hydroxyethylethylenediamine triacetate. The rheology enhancers of the present invention may be used with viscoelastic surfactant fluid systems that contain such additives as co-surfactants, organic acids, organic acid salts, and/or inorganic salts.

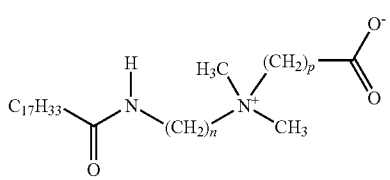

Surfactant in BET-O-30 (when n=3 and p=1)

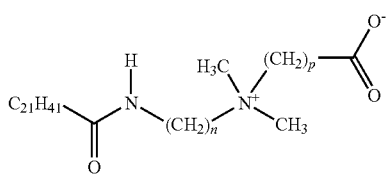

Surfactant in BET-E-40 (when n=3 and p=1)

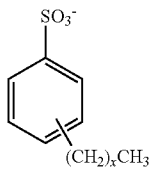

SDBS (when x=11 and the counter-ion is $Na^+$)

Some embodiments of the present invention use betaines; most preferred use BET-E-40. Although experiments have not been performed, it is believed that mixtures of betaines, especially BET-E-40, with other surfactants are also suitable. Such mixtures are within the scope of embodiments of the invention.

Other betaines that are suitable include those in which the alkene side chain (tail group) contains 17-23 carbon atoms (not counting the carbonyl carbon atom) which may be branched or straight chained and which may be saturated or unsaturated, n=2–10, and p=1–5, and mixtures of these compounds. More preferred betaines are those in which the alkene side chain contains 17-21 carbon atoms (not counting the carbonyl carbon atom) which may be branched or straight chained and which may be saturated or unsaturated, n=3–5, and p=1–3, and mixtures of these compounds. These surfactants are used at a concentration of about 0.5 to about 10%, preferably from about 1 to about 5%, and most preferably from about 1.5 to about 4.5%.

Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference. Examples of suitable cationic viscoelastic surfactants include cationic surfactants having the structure:

$R_1N^+(R_2)(R_3)(R_4)X^-$ in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4) X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, copolymers, and mixtures of these members. They may also contain performance enhancers, such as viscosity enhancers, for example polysulfonates, for example polysulfonic acids, as described in U.S. Pat. No. 7,084,095 which is hereby incorporated by reference.

Another suitable cationic VES is erucyl bis(2-hydroxyethyl) methyl ammonium chloride, also known as (Z)-13 docosenyl-N—N-bis(2-hydroxyethyl) methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; and cetylamino, N-octadecyl pyridinium chloride.

Many fluids made with viscoelastic surfactant systems, for example those containing cationic surfactants having structures similar to that of erucyl bis(2-hydroxyethyl) methyl ammonium chloride, inherently have short re-heal times and the rheology enhancers of the present invention may not be needed except under special circumstances, for example at very low temperature.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Pat. Nos. 6,239, 183; 6,506,710; 7,060,661; 7,303,018; and 7,510,009 for example amidoamine oxides. These references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In some embodiments, the anionic surfactant is an alkyl sarcosinate. The alkyl sarcosinate can generally have any number of carbon atoms. Presently preferred alkyl sarcosinates have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$$R_1CON(R_2)CH_2X$$

wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

To provide the ionic strength for the desired micelle formation, the treatment fluids of the present invention may comprise a water-soluble salt. Adding a salt may promote micelle formation for the viscosification of the fluid. In some embodiments, the aqueous base fluid may contain the water-soluble salt, for example, where saltwater, a brine, or seawater is used as the aqueous base fluid. Suitable water-soluble salts may comprise lithium, ammonium, sodium, potassium, cesium, magnesium, calcium, or zinc cations, and chloride, bromide, iodide, formate, nitrate, acetate, cyanate, or thiocyanate anions. Examples of suitable water-soluble salts that comprise the above-listed anions and cations include, but are not limited to, ammonium chloride, lithium bromide, lithium chloride, lithium formate, lithium nitrate, calcium bromide, calcium chloride, calcium nitrate, calcium formate, sodium bromide, sodium chloride, sodium formate, sodium nitrate, potassium chloride, potassium bromide, potassium nitrate, potassium formate, cesium nitrate, cesium formate, cesium chloride, cesium bromide, magnesium chloride, magnesium bromide, zinc chloride, and zinc bromide. In certain embodiments, the water-soluble salt may be present in the treatment fluids of the present invention in an amount in the range of from about 0.1% to about 40% by weight. In certain other embodiments, the water-soluble salt may be present in the treatment fluids of the present invention in an amount in the range of from about 1% to about 10% by weight.

The acid viscosity enhancer co-operates with the viscoelastic surfactant to increase viscosity of the treatment fluid compared to a fluid made of the viscoelastic surfactant alone in the aqueous base fluid. For cationic VES, as for example erucyl bis-(2-hydroxyethyl) methyl ammonium chloride, the enhancer is a mineral acid, a salt of an organic acid or an aromatic organic acid. In another embodiment, the enhancer for erucyl bis-(2-hydroxyethyl) methyl ammonium chloride is taken in the list constituted of: nitric acid, hydrochloric acid, sulfuric acid, ammonium persulfate, nitrate, phosphoric acid, salicylate, monosodium glutamate, sodium formate. In some embodiments, nitric acid is used in an amount in the range of from about 0.001% to about 1.5% by weight, preferably in the range of from about 0.01% to about 0.8%. In some embodiments, nitrates are used with same molar concentrations as the molar concentrations of pure nitric acid. In some embodiments, salicylate is used in an amount in the range of from about 0.005% to about 5% by weight, preferably in the range from about 0.01% to about 1%. In some embodiments, salicylic acid is used with same molar concentrations as the molar concentrations of salicylate. For zwitterionic VES as for example erucylamidopropyl betaine, the enhancer is an aromatic organic acid or the salt of an aromatic organic acid. In another embodiment, the enhancer for erucylamidopropyl betaine is salicylate. In some embodiments, salicylate is used in an amount in the range of from about 0.005% to about 5% by weight, preferably in the range from about 0.01% to about 1%. In some embodiments, salicylic acid is used with same molar concentrations as the molar concentrations of salicylate.

In some embodiments, the treatment fluids further comprise a breaker selected from the group consisting of oxidative breakers, enzymes, pH modifiers, metal chelators, metal complexors, polymer hydrolysis enhancers, and micelle disturbing substances. Any breaker material suitable for reducing viscosity of the disclosed gels may be employed. The breaker may be solid or liquid. The breaker may be encapsulated. The breaker can include delay breaker or impregnated breaker.

In some embodiments, the treatment fluids may optionally comprise a co-surfactant, among other things, to facilitate the formation of and/or stabilize a foam, increase salt tolerability, and/or stabilize the treatment fluid. The co-surfactant may comprise any surfactant suitable for use in subterranean environments that does not adversely affect the treatment fluid. Examples of suitable co-surfactants include betaines (e.g., cocobetaine, cocoamidopropylbetaine), amine oxides, derivatives thereof, and combinations thereof. One of ordinary skill in the art will be able to determine which co-surfactants are best suited to the particular embodiments and applications of the compositions and methods described herein.

The treatment fluids also typically contain proppants. The selection of a proppant involves many compromises imposed by economical and practical considerations. Criteria for selecting the proppant type, size, and concentration is based on the needed dimensionless conductivity, and can be selected by a skilled artisan. Such proppants can be natural or synthetic (including but not limited to glass beads, ceramic beads, sand, and bauxite), coated, or contain chemicals; more than one can be used sequentially or in mixtures of different sizes or different materials. The proppant may be resin coated, preferably pre-cured resin coated, provided that the resin and any other chemicals that might be released from the coating or come in contact with the other chemicals of the Invention are compatible with them. Proppants and gravels in the same or different wells or treatments can be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 0.96 kg/L, preferably from about 0.12 to about 0.72 kg/L, preferably from about 0.12 to about 0.54 kg/L. The fluid may also contain other enhancers or additives.

In other embodiments, the treatment fluids may further comprise an additive for maintaining and/or adjusting pH (e.g., pH buffers, pH adjusting agents, etc.). For example, the additive for maintaining and/or adjusting pH may be included in the treatment fluid so as to maintain the pH in, or adjust the pH to, a desired range and thereby maintain, or provide, the necessary ionic strength to form the desired micellar structures. Examples of suitable additives for maintaining and/or adjusting pH include, but are not limited to, sodium acetate, acetic acid, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium hydroxide, potassium hydroxide, lithium hydroxide, combinations thereof, derivatives thereof, and the like. The additive for adjusting and/or maintaining pH may be present in the treatment fluids of the present invention in an amount sufficient to maintain and/or adjust the pH of the fluid. One of ordinary skill in the art, with the benefit of this disclosure, will recognize the appropriate additive for maintaining and/or adjusting pH and amount thereof to use for a chosen application.

In some embodiments, the treatment fluids may optionally comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam a treatment fluid of the present invention using a gas, such as air, nitrogen, or carbon dioxide. In one certain embodiment, the treatment fluids of the present invention may contain a particulate additive, such as a particulate scale inhibitor.

According to the present invention, the treatment fluids may be used for carrying out a variety of subterranean treatments, where a viscosified treatment fluid may be used, including, but not limited to, drilling operations, fracturing treatments, and completion operations (e.g., gravel packing). In some embodiments, the treatment fluids of the present invention may be used in treating a portion of a subterranean formation. In certain embodiments, a treatment fluid that comprises an aqueous base fluid, an acid viscosity enhancer, and a VES may be introduced into a well bore that penetrates the subterranean formation. In some instances, the treatment fluid exhibits viscoelastic behavior which may be due, at least in part, to the association of at least a portion of the VES into a plurality of micellar structures. Optionally, the treatment fluid further may comprise particulates and other additives suitable for treating the subterranean formation. For example, the treatment fluid may be allowed to contact the subterranean formation for a period of time sufficient to reduce the viscosity of the treatment fluid. In some embodiments, the treatment fluid may be allowed to contact hydrocarbons, formations fluids, and/or subsequently injected treatment fluids, thereby reducing the viscosity of the treatment fluid. After a chosen time, the treatment fluid may be recovered through the well bore.

In certain embodiments, the treatment fluids may be used in fracturing treatments. In the fracturing embodiments, a treatment fluid that comprises an aqueous base fluid, an acid viscosity enhancer, and a VES may be introduced into a well bore that penetrates a subterranean formation at or above a pressure sufficient to create or enhance one or more fractures in a portion of the subterranean formation. Generally, in the fracturing embodiments, the treatment fluid may exhibit viscoelastic behavior which may be due, at least in part, to the association of at least a portion of the VES into a plurality of micellar structures. Optionally, the treatment fluid further may comprise particulates and other additives suitable for the fracturing treatment. After a chosen time, the treatment fluid may be recovered through the well bore.

The present method of the invention is also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

In certain embodiments, the treatment fluids of the present invention may be used for providing some degree of sand control in a portion of the subterranean formation. In the sand control embodiments, a treatment fluid that comprises an aqueous base fluid, an acid viscosity enhancer, particulates, and a VES may be introduced into a well bore that penetrates the subterranean formation such that the particulates form a gravel pack in or adjacent to a portion of the subterranean formation.

In certain embodiments, in acid fracturing, compositions according to the invention are used to create fractures that have wormholes in the fracture faces far from the wellbore. This is done during a stimulation treatment, either during or after the propping step, with proper control of and balance between the reaction rate, the diffusion rate, and the pump rate (that controls the convection rate) for a given injected reactive formation-dissolving fluid, and a given formation temperature, pressure and composition. Through the control of the pump rate and of the fluid reactivity, reactive formation-dissolving fluid efficiency in creating desirably located wormholes is achieved and the stimulation is optimized. The process is described in U.S. Pat. Nos. 7,165,613; 7,303,012 and 7,114,567, each of which is incorporated herein by reference.

To facilitate a better understanding of the present invention, the following examples of embodiments are given. In no way should the following examples be read to limit, or define, the scope of the invention.

EXAMPLES

A series of experiments were conducted to analyze effect of the acidic component on the viscosity profile of the viscoelastic surfactant. In the foregoing VES1 contains about 60% erucyl bis-(2-hydroxyethyl) methyl ammonium chloride and VES2 contains about 40% erucic amidopropyl dimethyl betaine (also known as erucylamidopropyl betaine).

Example 1

Nitric Acid

FIG. 1 shows viscosity profile for VES1 tested with nitric acid. To make the base gel, 4% VES1 was added to 4% KCl water solution, and blended until the fluid was foamed up.

The fluid was then de-foamed with a centrifuge. The de-foamed fluid (the gel) was used as the base gel. Various concentrations of 10% nitric acid was evenly mixed into the base gel, and the fluid viscosity was measured with a Fann50-type HPHT viscometer following the API RP 39 schedule (same below). In FIG. 1, the viscosity at 76.7 deg C. is shown for the base gel containing various concentrations of 10% nitric acid at 0% (baseline), 0.5%, 2%, and 4%, respectively. The viscosity of the base gel containing 10% nitric acid at 0.5% was at least 22% higher than that of the base fluid. The viscosity of the nitric acid-contained gels was also significantly higher at lower shear rate, for example, at 25/s. With the addition of an acid corrosion inhibitor (which may be needed or requested in some applications), the viscosity enhancement through the addition of the nitric acid, qualitatively, remained similar.

Figure 2:
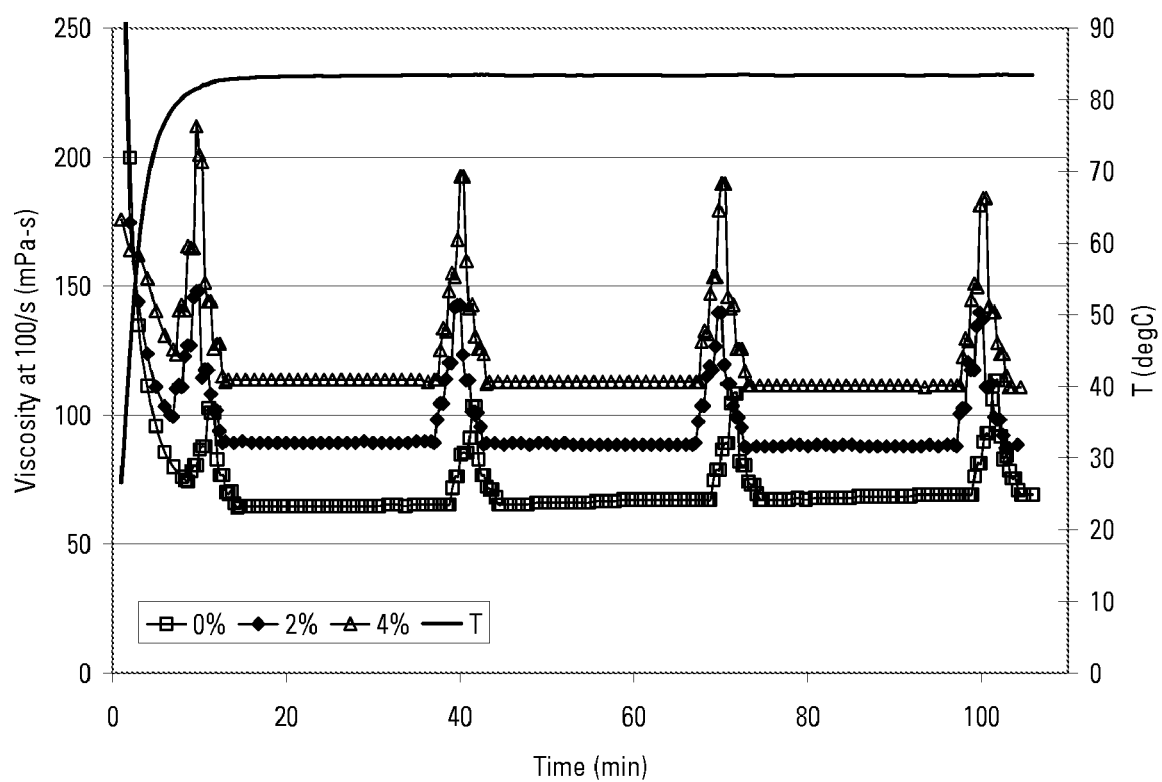
FIG. 2 shows viscosity profiles at 83.3 deg C. for VES1 at 4.5% by weight in 4% by weight KCl brine with 10% by weight nitric acid for various concentrations 0%, 2%, and 4% respectively.

Another gel was similarly prepared that contained 4% KCl and 4.5% VES1, and 10% nitric acid was added at concentrations of 2% and 4%, respectively. The fluid viscosity was similarly measured at 83.3 deg C. and is shown in FIG. 2. Again, the addition of 10% nitric acid enhanced the VES viscosity by about 37% for the 10% nitric acid at 2% or 75% for the 10% nitric acid at 4%.

Figure 3:
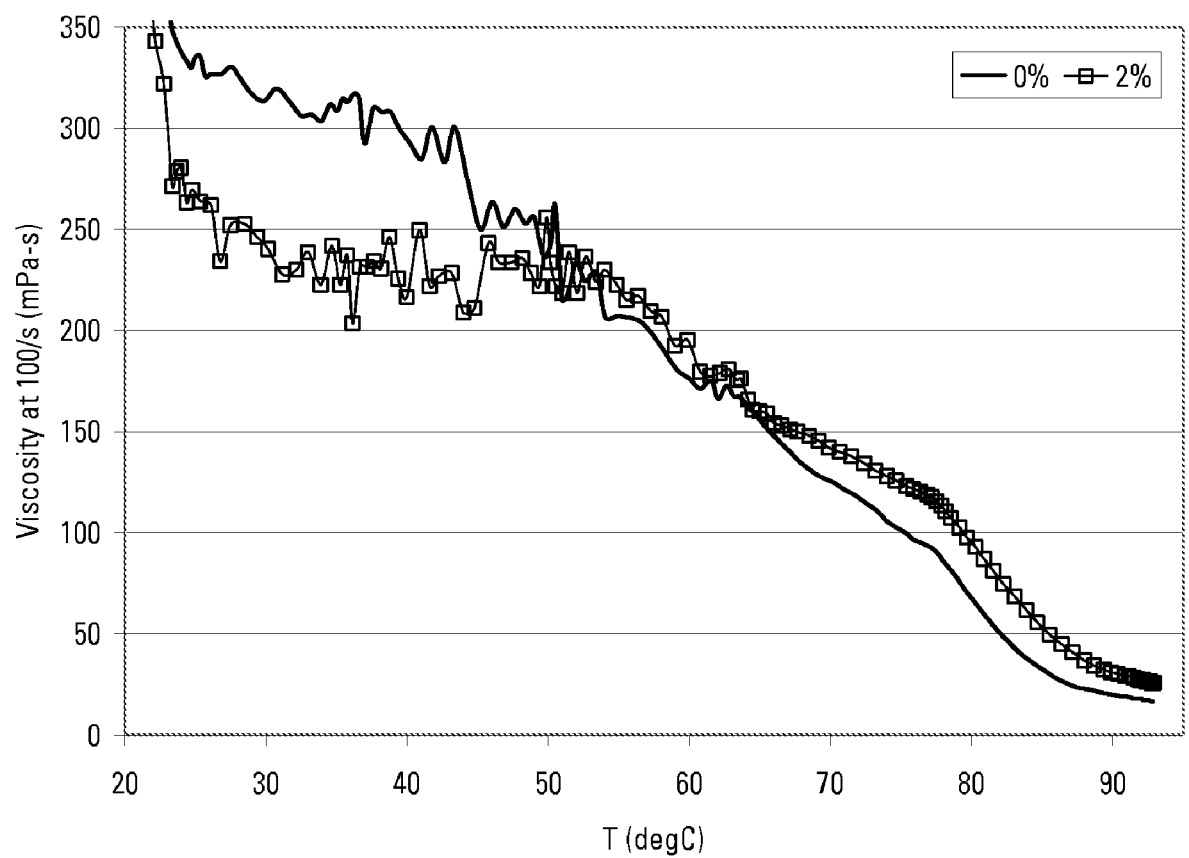
FIG. 3 shows viscosity profiles vs. temperature for VES1 at 4% by weight in 4% by weight KCl brine without nitric acid and with 10% by weight nitric acid at a concentration of 2%, respectively.

The viscosity vs. temperature curves were collected for the base gel containing 4% KCl and 4% VES1, and for the base gel mixed with 10% nitric acid at a concentration of 2%. The result is shown in FIG. 3. At higher temperatures, especially above 65.5 deg C., the addition of 10% nitric acid at a concentration of 2% boosted the fluid viscosity significantly. For example, at 76.7 deg C., the viscosity increase was about 27%, consistent with the result shown in FIG. 1. At lower temperatures, especially below 43.3 deg C., the addition of 10% nitric acid at a concentration of 2% lowered the fluid viscosity, which may help save the pumping energy.

To make the VES2 base gel, 6.5% VES2 was added to 4% KCl water solution, and blended until the fluid was foamed up. The fluid was then de-foamed with a centrifuge. The de-foamed fluid (a gel) was used as the base gel. Various concentrations of 10% nitric acid was evenly mixed into the base gel, and the fluid viscosity was measured with a Fann50-type HPHT viscometer following the API RP 39 schedule. The viscosity at 76.7 deg C. was measured for the base gel containing various concentrations of the 10% nitric acid at 0%, 0.1%, and 0.5%, respectively. The base gel containing the 10% nitric acid at 0.1% or 0.5% showed reduced viscosity when compared with the base fluid, suggesting that the addition of the nitric acid could damage the fluid viscosity for VES2 (data not shown). On the contrary, the same nitric acid enhanced the fluid viscosity for VES1 as shown in FIGS. 1 and 2.

Example 2

Nitrates

Figure 4:
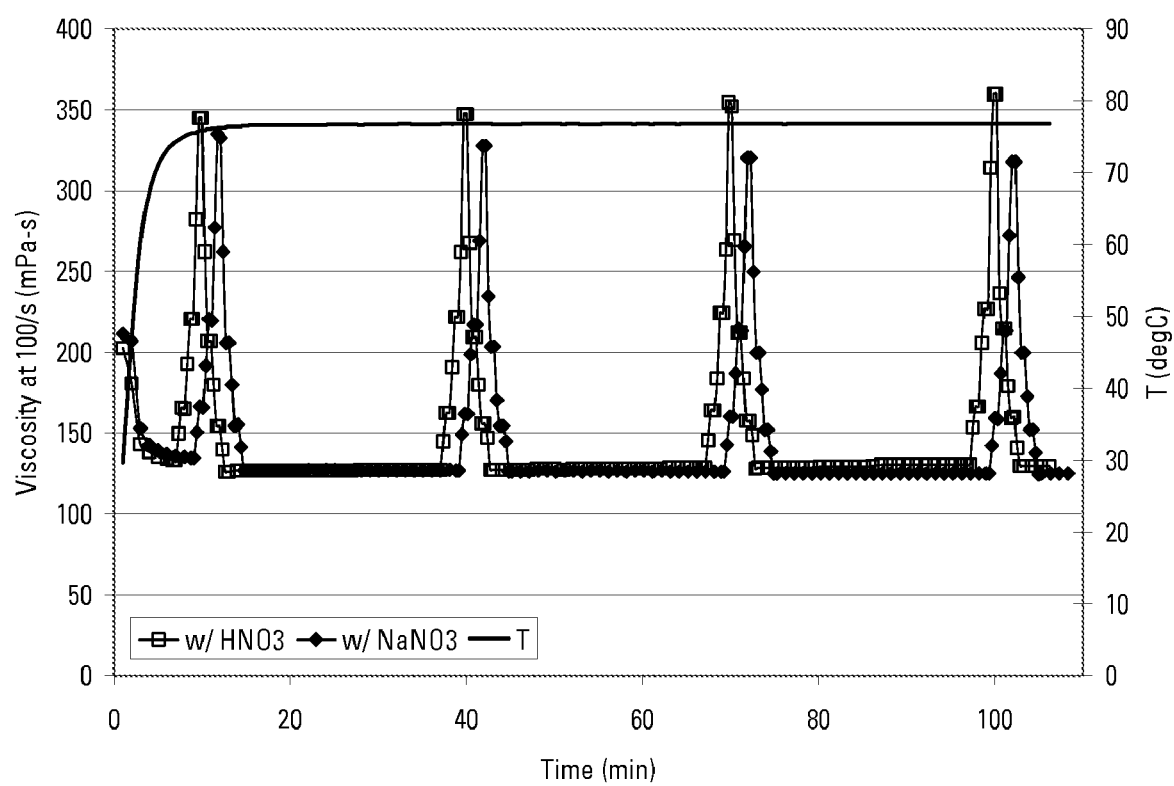
FIG. 4 shows viscosity profiles at 76.7 deg C. for VES1 at 4% by weight in 4% by weight KCl brine containing 10% by weight nitric acid at a concentration of 2%, and for VES1 at 4% by weight in 4% by weight KCl brine containing 0.032M (1M=1 mole/L) $NaNO_3$, respectively.

Nitrates, such as $NaNO_3$, $KNO_3$, or $NH_4NO_3$, were found capable of increasing the viscosity of some VES fluids. In one example, 0.032M $NaNO_3$ was added to the base gel containing 4% KCl and 4% VES1. $NaNO_3$ was added in such an amount that its molar concentration was the same as the $HNO_3$ molar concentration of 10% $HNO_3$ added at a concentration of 2% to the same base gel. The viscosity at 76.7 deg C. is shown in FIG. 4 for the base gel mixed with either 10% nitric acid at a concentration of 2% or $NaNO_3$ at a concentration of 0.032M. The two viscosity curves almost traced each other, suggesting that nitrates played a similar function of enhancing the VES viscosity as nitric acid did.

Example 3

Hydrochloric Acid

Figure 5:
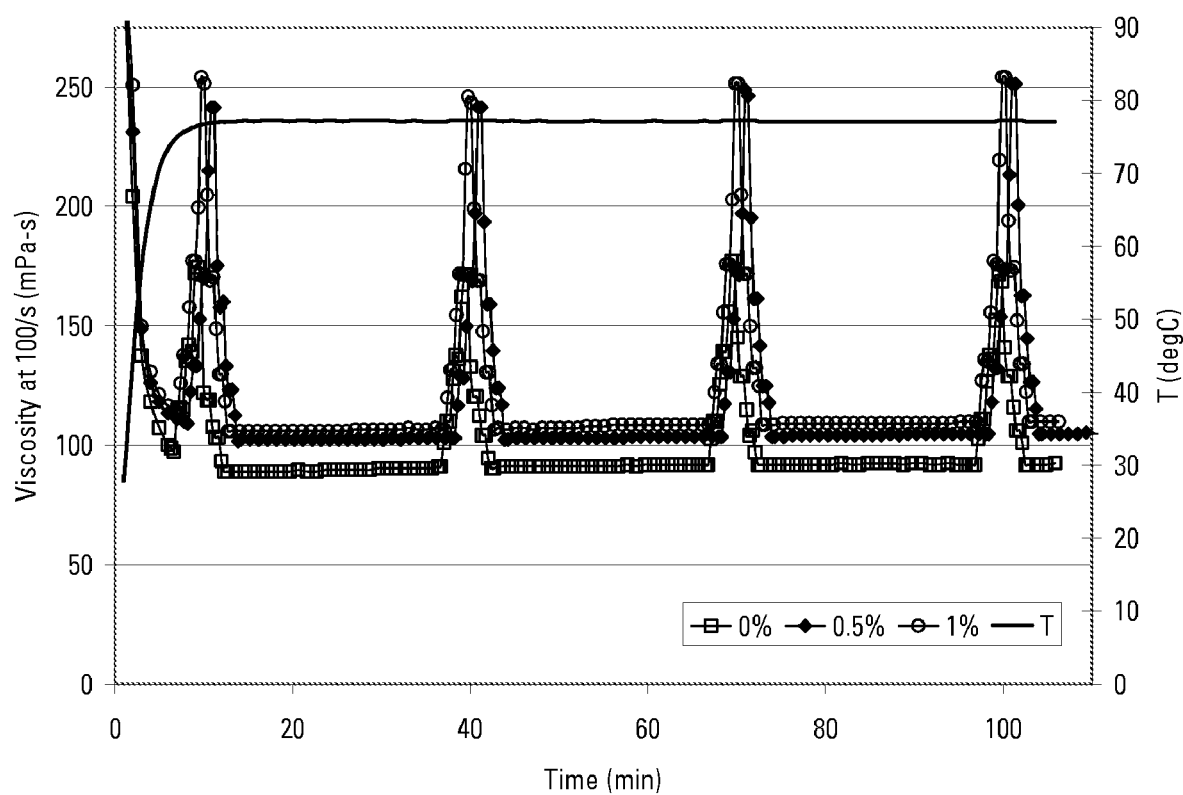
FIG. 5 shows viscosity profiles at 76.7 deg C. for VES1 at 4% by weight in 4% by weight KCl brine with 10% by weight HCl for various concentrations 0%, 0.5%, and 1% respectively.

To make the base gel, 4% VES1 was added to 4% KCl water solution, and blended until the fluid was foamed up. The fluid was then de-foamed with a centrifuge. The de-foamed fluid was used as the base gel. Various concentrations of 10% HCl was evenly mixed into the base gel, and the fluid viscosity was measured with a Fann50-type HPHT viscometer following the API RP 39 schedule. In FIG. 5, the viscosity at 76.7 deg C. is shown for the base gel containing various concentrations of 10% HCl at 0%, 0.5%, and 1%, respectively. The viscosity of the base gel containing 10% HCl at 0.5% was at least 12% higher than that of the base fluid. The viscosity of the HCl-contained gels was also significantly higher at lower shear rate at, for example, 25/s. The viscosity enhancing effect of 10% HCl was not as prominent as that of 10% $HNO_3$ at the same temperature in the same VES fluid.

Example 4

Sulfuric Acid, Hydrogen Sulfate

Figure 6:
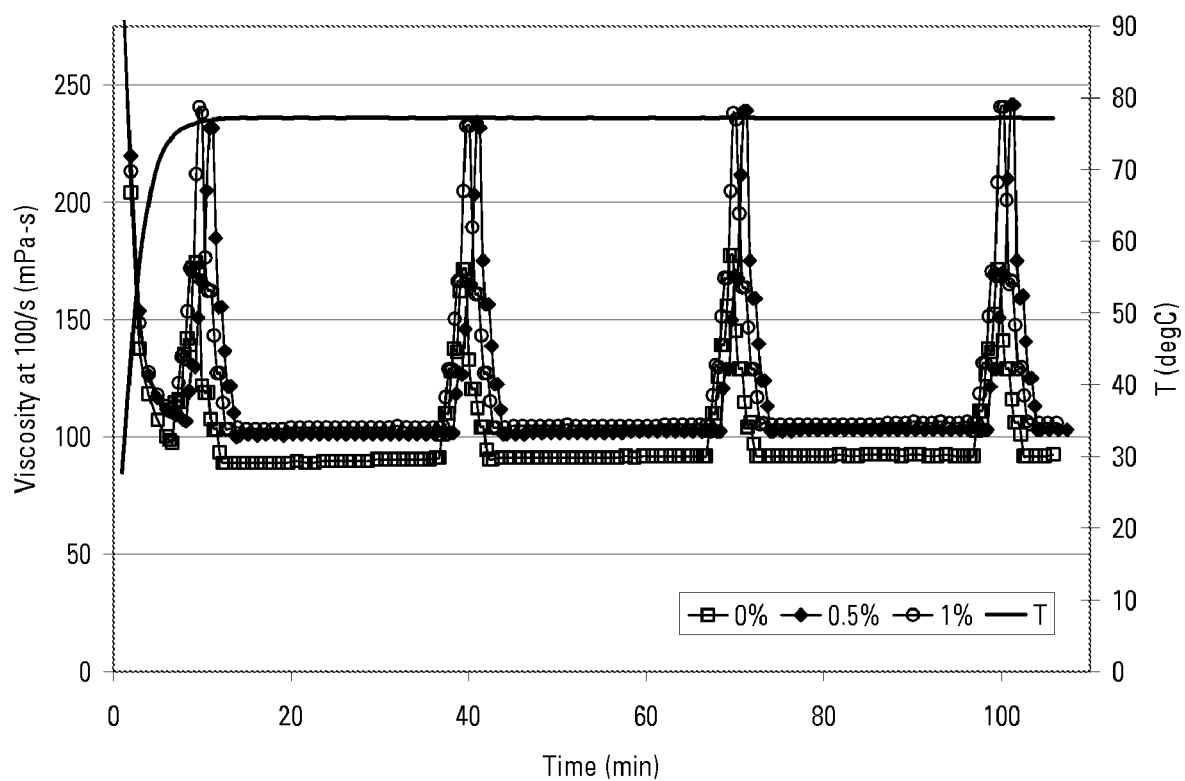
FIG. 6 shows viscosity profiles at 76.7 deg C. for VES1 at 4% by weight in 4% by weight KCl brine with 3M $H_2SO_4$ for various concentrations 0%, 0.5%, and 1% respectively.

To make the base gel, 4% VES1 was added to 4% KCl water solution, and blended until the fluid was foamed up. The fluid was then de-foamed with a centrifuge. The de-foamed fluid was used as the base gel. Various concentrations of 3M $H_2SO_4$ was evenly mixed into the base gel, and the fluid viscosity was measured with a Fann50-type HPHT viscometer following the API RP 39 schedule. In FIG. 6, the viscosity at 76.7 deg C. is shown for the base gel containing various concentrations of 3M $H_2SO_4$ at 0%, 0.5% and 1%, respectively. The viscosity of the base gel containing 3M $H_2SO_4$ at 0.5% was at least 12% higher than that of the base fluid. The viscosity of $H_2SO_4$-contained gels was also significantly higher at lower shear rate at, for example, 25/s. The viscosity enhancing effect of 3M $H_2SO_4$ was not as prominent as that of 10% $HNO_3$ at the same temperature in the same VES fluid. Other chemicals such as hydrogen sulfates may act similarly as sulfuric acid.

Example 5

Ammonium Persulfate

Figure 7:
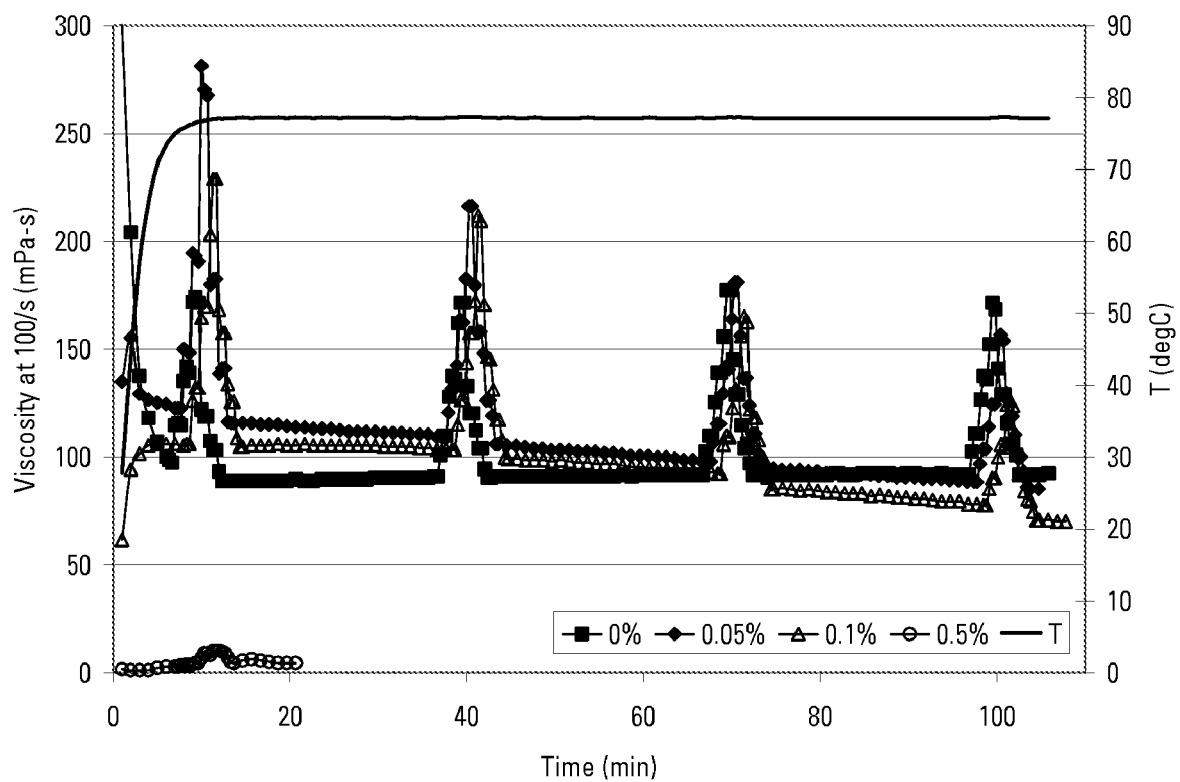
FIG. 7 shows viscosity profiles at 76.7 deg C. for VES1 at 4% by weight in 4% by weight KCl brine with ammonium persulfate for various concentrations 0%, 0.05%, 0.1%, and 0.5% respectively.

Ammonium persulfate may decompose and generate sulfuric acid under appropriate conditions. This test was to show if ammonium persulfate could act as a viscosity enhancer for VES1 fluid. To make the base gel, 4% VES1 was added to 4% KCl water solution, and blended until the fluid was foamed up. The fluid was then de-foamed with a centrifuge. The de-foamed fluid was used as the base gel. Various concentrations of ammonium persulfate was evenly mixed into the base gel, and the fluid viscosity was measured with a Fann50-type HPHT viscometer following the API RP 39 schedule. In FIG. 7, the viscosity at 76.7 deg C. is shown for the base gel containing various concentrations of ammonium persulfate at 0%, 0.05%, 0.1%, and 0.5%, respectively. The viscosity of the base gel containing ammonium persulfate at 0.05% was at least 30% higher than that of the base fluid in the beginning, but dropped gradually over time and fell below the baseline at about 90 minutes. The base gel containing ammonium persulfate at 0.1% showed similar behaviors. When the ammonium persulfate concentration was too high, for example, at 0.5%, the fluid viscosity was quickly damaged. At appropriate concentrations, ammonium persulfate could, therefore, act both as the viscosity enhancer in the beginning and as the internal viscosity breaker.

Example 6

Phosphoric Acid, Dihydrogen Phosphate, Hydrogen Phosphate

Figure 8:
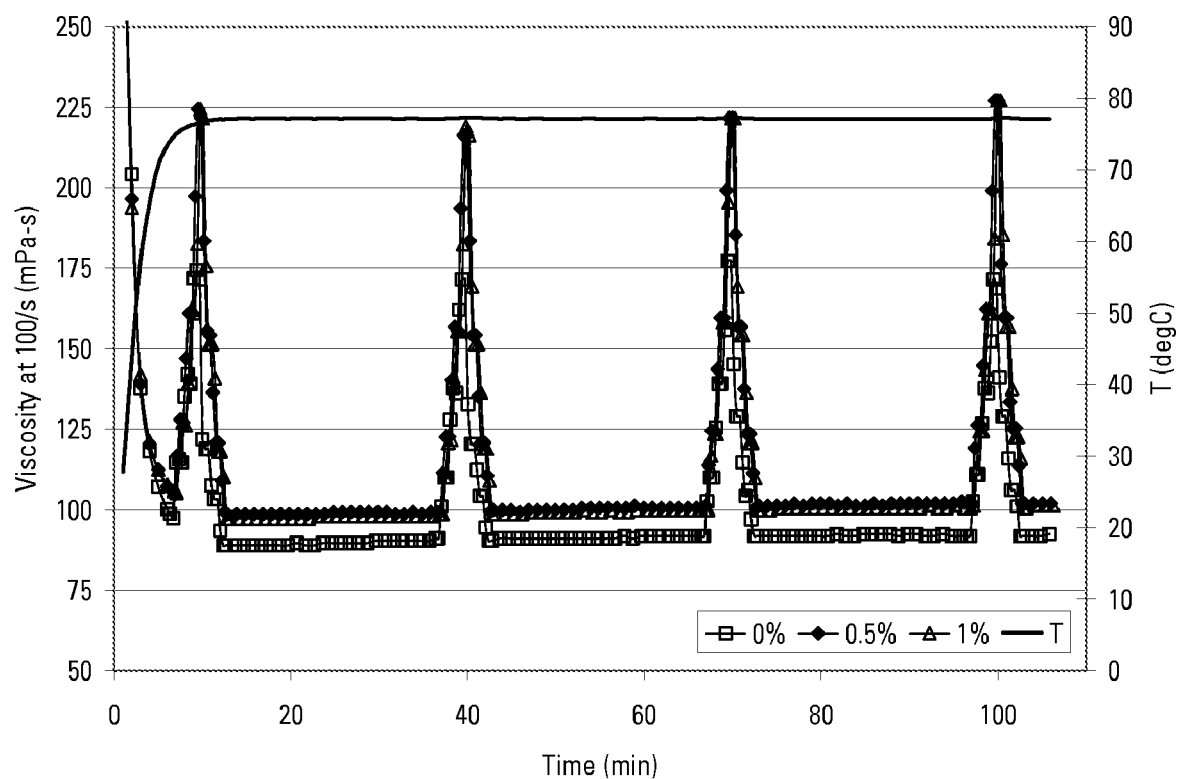
FIG. 8 shows viscosity profiles at 76.7 deg C. for VES1 at 4% by weight in 4% by weight KCl brine with 85% by weight $H_3PO_4$ for various concentrations 0%, 0.5%, and 1%, respectively.

To make the base gel, 4% VES1 was added to 4% KCl water solution, and blended until the fluid was foamed up. The fluid was then de-foamed with a centrifuge. The de-foamed fluid was used as the base gel. Various concentrations of 85% $H_3PO_4$ was evenly mixed into the base gel, and the fluid viscosity was measured with a Fann50-type HPHT viscometer following the API RP 39 schedule. In FIG. 8, the viscosity at 76.7 deg C. is shown for the base gel containing various concentrations of 85% $H_3PO_4$ at 0%, 0.5% and 1%, respectively. The viscosity of the base gel containing 85% $H_3PO_4$ at 0.5% or 1% was about 11% higher than that of the base fluid. The viscosity enhancing effect of the 85% $H_3PO_4$ was not as prominent as that of the 10% $HNO_3$ at the same temperature in the same VES fluid. Other chemicals such as dihydrogen phosphates or hydrogen phosphates may act similarly as phosphoric acid.

Example 7

Salicylate

Figure 9:
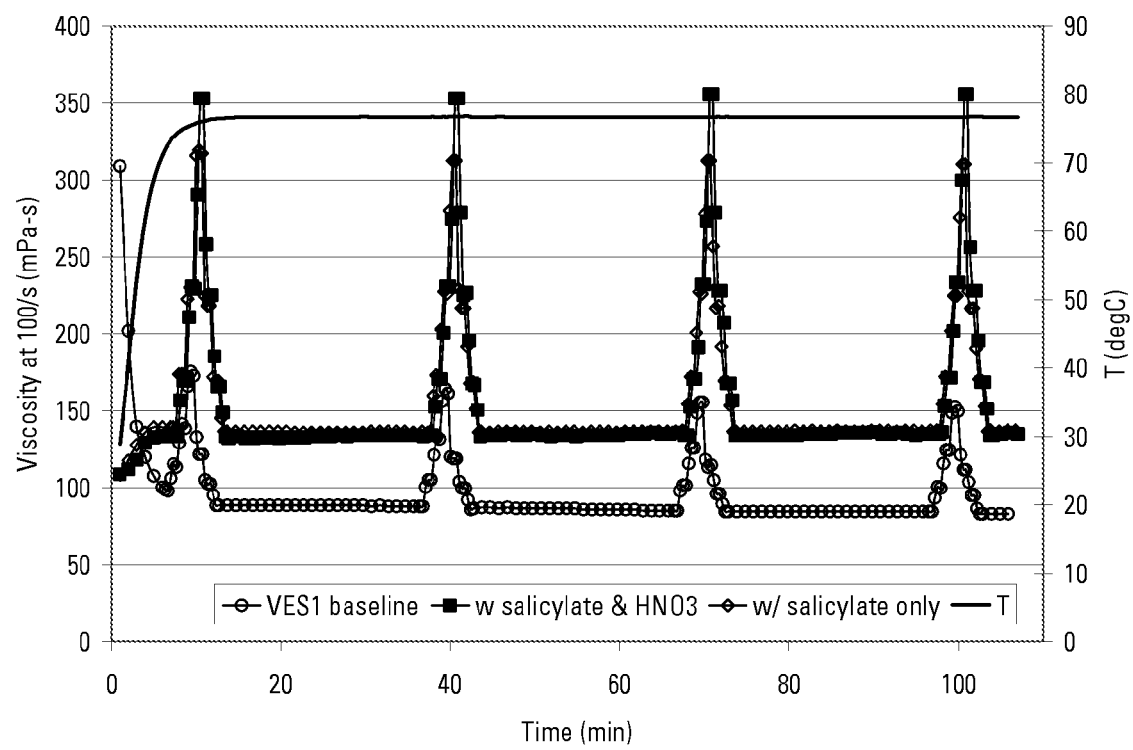
FIG. 9 shows viscosity profiles at 76.7 deg C. for VES1 at 4% by weight in 4% by weight KCl brine (baseline), for VES1 at 4% by weight in 4% by weight KCl brine with 10% by weight nitric acid at a concentration of 2% and 0.1% sodium salicylate, and for VES1 at 4% by weight in 4% by weight KCl brine with 0.1% sodium salicylate, respectively.

Salicylates such as sodium salicylate were found capable of enhancing viscosity of some VES fluid. The same base gel as in example 1 was used that contained 4% KCl and 4% VES1. About 0.1% sodium salicylate was added to the based gel, and its viscosity was measured at 76.7 deg C. Another fluid was prepared with the same base gel, 0.1% sodium salicylate, and the 10% nitric acid at a concentration of 2%. The viscosity was similarly measured, and the results were shown in FIG. 9. The two viscosity curves nearly traced each other, suggesting that sodium salicylate could increase the VES viscosity by about 50% (when compared with the VES1 baseline viscosity) with or without the presence of nitric acid (or at low pH).

Also, salicylate acts as an enhancer for VES2 fluid. The base gel here was similarly prepared that contained 4% KCl and 6.5% VES2. About 0.1% sodium salicylate was added to the based gel, and its viscosity was measured at 76.7 deg C. with the same viscometer and measuring schedule. The viscosity enhancement was about 13% compared with the base gel.

Example 8

Monosodium Glutamate

The base gel here was similarly prepared that contained 4% KCl and 4% VES1. About 0.3% monosodium glutamate was added to the based gel, and its viscosity was measured at 76.7 deg C. with the same viscometer and measuring schedule. The viscosity enhancement was about 17% compared with the base gel. When the monosodium glutamate was reduced to 0.1%, the viscosity enhancement was about 13%.

Example 9

Sodium Formate

The base gel here was similarly prepared that contained 4% KCl and 4% VES1. About 0.15% sodium formate was added to the based gel, and its viscosity was measured at 76.7 deg C. with the same viscometer and measuring schedule. The viscosity enhancement was about 17% compared with the base gel. Increasing the sodium formate to 0.3% yielded a similar enhancement.

Example 10

Formic Acid

To make the base gel, 4% VES1 was added to 4% KCl water solution, and blended until the fluid was foamed up. The fluid was then de-foamed with a centrifuge. The de-foamed fluid was used as the base gel. Various concentrations of 10% formic acid was evenly mixed into the base gel, and the fluid viscosity was measured with a Fann50-type HPHT viscometer following the API RP 39 schedule. The viscosity at 76.7 deg C. was measured for the base gel containing various concentrations of the 10% formic acid at 0%, 1% and 2%, respectively. The viscosity of the base gel containing the 10% formic acid at 1% or 2% was very close to that of the base fluid, within measurement errors (fluctuations). This suggests that the addition of the formic acid did not help enhance the fluid viscosity for VES1 (data not shown).

Example 11

Acetic Acid

The base gel here was similarly prepared that contained 4% KCl and 4% VES1. The viscosity at 76.7 deg C. was measured for the base gel containing various concentrations of the 50% acetic acid at 0%, 0.5%, 1%, and 2%, respectively. The viscosity of the base gel containing the 50% acetic acid at 0.5% was very close to that of the base fluid, within measurement errors (fluctuations). The base gel containing the 50% acetic acid at 1% or 2% showed reduced viscosity when compared with the base fluid. This suggests that the addition of the acetic acid could damage the fluid viscosity for VES1 (data not shown).

Example 12

Lactic Acid

The base gel here was similarly prepared that contained 4% KCl and 4% VES1. The viscosity at 76.7 deg C. was measured for the base gel containing various concentrations of the 85% lactic acid at 0%, 0.1%, and 0.5%, respectively. The viscosity of the base gel containing the 85% acetic acid at 0.1% was very close to that of the base fluid, almost within measurement errors (fluctuations). The base gel containing the 85% lactic acid at 0.5% showed reduced viscosity when compared with the base fluid. This suggests that the addition of the lactic acid could damage the fluid viscosity for VES1 (data not shown).

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method of treating a subterranean formation of a well bore, the method comprising:
   providing a treatment fluid comprising: an aqueous base fluid; a viscosity enhancer; and a cationic viscoelastic surfactant, wherein the enhancer is selected from the group consisting of salicylate, HCl, $HNO_3$, and salts of HCl or $HNO_3$ in the aqueous base fluid, is in a concentration by weight in the range of from 0.001% to 0.5% and co-operates with the viscoelastic surfactant to enhance viscosity compared to viscoelastic surfactant alone in the aqueous base fluid; and
   introducing the treatment fluid into the well bore.

2. The method of claim 1, wherein the enhancer co-operates with the viscoelastic surfactant to increase viscosity compared to viscoelastic surfactant alone in the aqueous base fluid.

3. The method of claim 1, wherein the viscoelastic surfactant is erucyl bis-(2-hydroxyethyl)methyl ammonium chloride.

4. The method of claim 1, wherein the treatment fluid is foamed or energized.

5. A method of fracturing a subterranean formation of a well bore, the method comprising: providing a treatment fluid comprising: an aqueous base fluid; from 0.001% to 0.5% a viscosity enhancer; and a viscoelastic surfactant, wherein the enhancer is acid in the aqueous base fluid and co-operates with the viscoelastic surfactant to enhance viscosity compared to viscoelastic surfactant alone in the aqueous base fluid; and introducing the treatment fluid into the well bore at or above a pressure sufficient to create or enhance one or more fractures in a portion of the subterranean formation; wherein the viscosity enhancer is selected from the group consisting of salicylate, HCl, $HNO_3$, and salts of HCl or $HNO_3$.

6. The method of claim 5, wherein the enhancer co-operates with the viscoelastic surfactant to increase viscosity compared to viscoelastic surfactant alone in the aqueous base fluid.

7. The method of claim 5, wherein the viscoelastic surfactant is erucyl bis-(2-hydroxyethyl)methyl ammonium chloride.

8. The method of claim 5, further comprising introducing proppant into the well bore.

9. The method of claim 5, further comprising creating or enhancing wormholes in one or more fractures.

10. A method of gravel packing a subterranean formation of a well bore, the method comprising: providing a fluid comprising: an aqueous base fluid; from 0.001% to 0.5% a viscosity enhancer; and a viscoelastic surfactant, wherein the enhancer is acid in the aqueous base fluid and co-operates with the viscoelastic surfactant to enhance viscosity compared to viscoelastic surfactant alone in the aqueous base fluid; and introducing the fluid into the well bore; wherein the viscosity enhancer is selected from the group consisting of salicylate, HCl, $HNO_3$, and salts of HCl or $HNO_3$.

11. The method of claim 10, wherein the enhancer co-operates with the viscoelastic surfactant to increase viscosity compared to viscoelastic surfactant alone in the aqueous base fluid.

12. The method of claim 10, wherein the viscoelastic sufactant is crucyl bis-(2-hydroxyethyl)methyl ammonium chloride.

13. The method of claim 10, wherein the treatment fluid is foamed or energized.

14. The method of claim 10, further comprising introducing proppant into the well bore.

* * * * *